(12) United States Patent
Staub

(10) Patent No.: US 7,972,139 B2
(45) Date of Patent: Jul. 5, 2011

(54) TRAINING DEVICE FOR FORCIBLY OPENING A LOCKED DOOR

(76) Inventor: Gregg W. Staub, New Oxford, PA (US)

( * ) Notice: Subject to any disclaimer, the term of this patent is extended or adjusted under 35 U.S.C. 154(b) by 315 days.

(21) Appl. No.: 12/321,938

(22) Filed: Jan. 27, 2009

(65) Prior Publication Data

US 2010/0186324 A1 Jul. 29, 2010

(51) Int. Cl.
*G09B 19/00* (2006.01)
(52) U.S. Cl. ...................................................... 434/226
(58) Field of Classification Search .................. 434/219, 434/226, 247, 258; 49/381, 394, 504; 292/163, 292/219, 240, 241, 261
See application file for complete search history.

(56) References Cited

U.S. PATENT DOCUMENTS

| | | | |
|---|---|---|---|
| 2,888,288 A | 5/1959 | Rigaud | |
| 5,209,530 A | 5/1993 | Kolloch | |
| 5,906,493 A | 5/1999 | Bishop | |
| 6,185,881 B1 * | 2/2001 | Olberding et al. | 52/204.1 |
| 6,877,988 B2 | 4/2005 | Phillips et al. | |
| 7,611,356 B1 * | 11/2009 | Bishop | 434/226 |
| 7,789,666 B2 * | 9/2010 | Sovine et al. | 434/226 |
| 2005/0050816 A1 | 3/2005 | Manning et al. | |
| 2008/0014564 A1 | 1/2008 | Allen | |

* cited by examiner

*Primary Examiner* — Kurt Fernstrom
(74) *Attorney, Agent, or Firm* — Staurt J. Friedman

(57) ABSTRACT

A training device for training the techniques of forcible entry through a locked door includes a door having an inner vertical edge, the door being hingedly mounted within a door frame for swinging movement between closed and open positions, the door frame including a hollow vertical jamb having a vertical surface adjacent the inner vertical edge of the door and an opening in the vertical surface communicating with the hollow. A pin projects from the door and is received within the opening in the jamb. When the door is in the closed position the pin is clamped by a pair of vertically opening and closing hinged jaws, the jaws being operable within the hollow between open and closed positions and being biased into the closed position by compression springs.

22 Claims, 9 Drawing Sheets

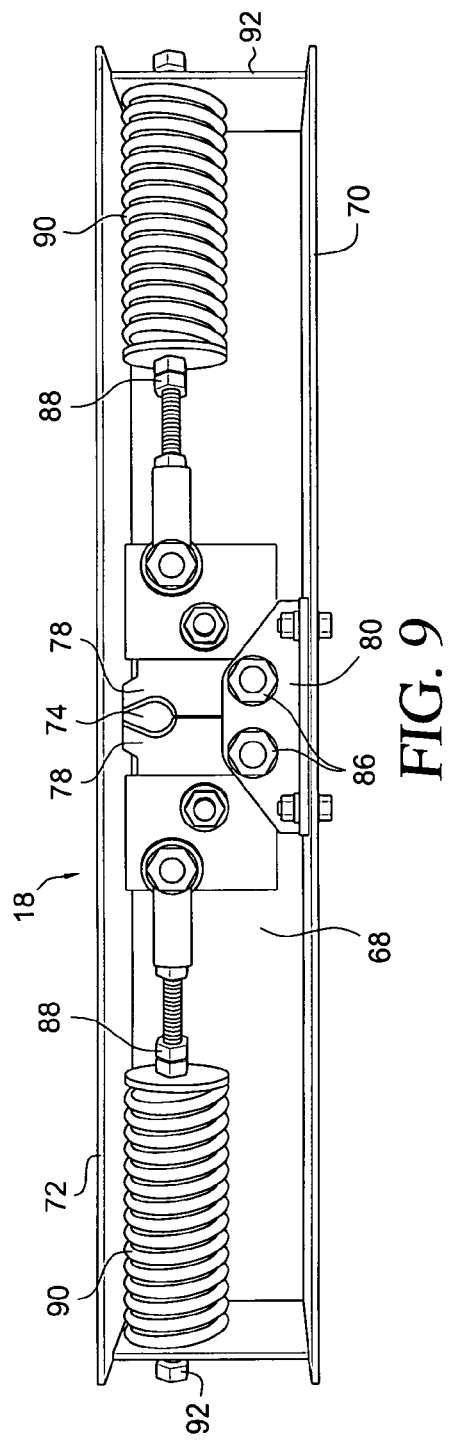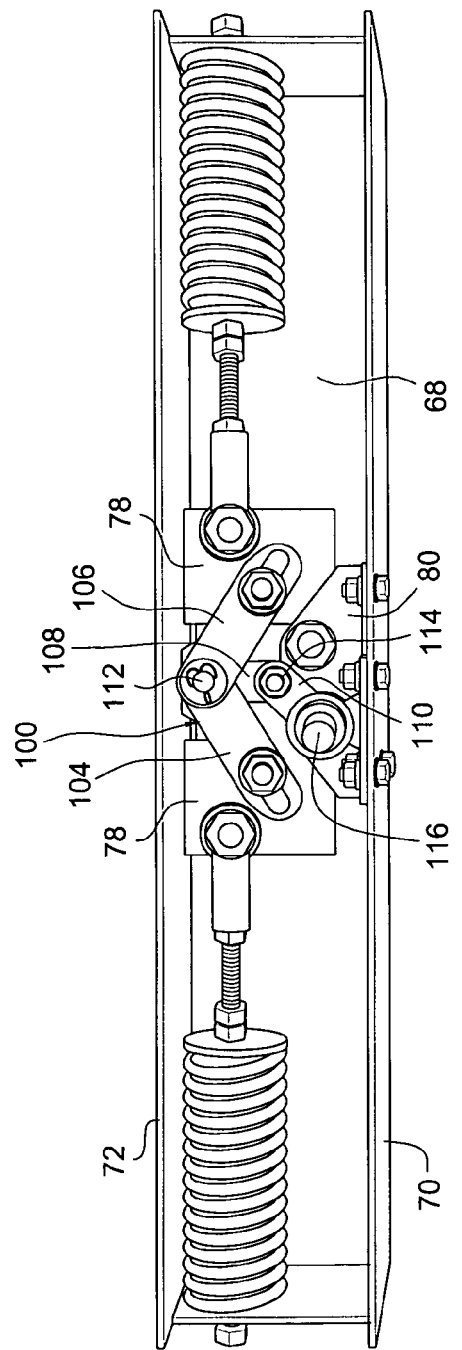
FIG. 9
FIG. 10

US 7,972,139 B2

TRAINING DEVICE FOR FORCIBLY OPENING A LOCKED DOOR

FIELD OF THE INVENTION

The present invention relates to a training device for forcibly opening a locked door and, more particularly, to a training device which simulates a variety of forced door entry conditions and which is reusable for training emergency personnel in the proper techniques for prying open a locked door.

BACKGROUND OF THE INVENTION

In emergency situations it is necessary for emergency personnel, such as firefighters, EMS teams and law enforcement personnel to gain access to the interior spaces of buildings, such as a burning structure. Commonly, locked doors which are encountered within the structure, are forcibly opened using a tool such as a "Haligan" crowbar type tool. Thus, emergency personnel training involves teaching the skill of forcibly entering spaces through locked doors using such tools. As with the teaching of any skill, the relevant techniques are best taught through repetitive practice wherein the students practice the techniques of prying open locked doors. It will be appreciated that where ordinary doors are used for training purposes, these doors are damaged by the students and many doors are ruined during training.

It is, therefore, not practical to utilize and ruin ordinary doors during training. Accordingly, several forcible entry door simulators have been developed which are reusable and allow students to practice the techniques of forcible door entry. Illustrative simulators are disclosed in U.S. Pat. No. 5,906,493—Bishop and U.S. Pat. No. 6,877,988—Phillips et al and in U.S. Patent Application Publications Nos. 2005/0050816—Manning et al and 2008/0014564—Allen. Known simulators suffer from one or more shortcomings, such as being unduly complicated and expensive, utilizing standard doors which are readily damaged, failing to provide a realistic training experience and not being truly reusable a sufficient number of times, which render their use impractical. Accordingly, there is a need for a forcible entry door simulator which is inexpensive to construct, durable, easy to use and to reset for re-use, reusable over and over again and which provides a realistic training experience through which students can become skilled at the techniques of forcible entry through locked doors.

SUMMARY OF THE INVENTION

It is, therefore, a primary object of the present invention to provide a forcible entry door simulator which is simple, inexpensive to construct or purchase and easy to use and reset for re-use.

It is another object of the present invention to provide a forcible entry door simulator which is durable and reusable multiple times.

It is still another object of the present invention to provide a forcible entry door simulator which provides a realistic training experience for students in learning the techniques of forcible entry through locked doors.

It is yet another object of the present invention to provide a forcible entry door training device which simulates the resistance of a locked door and which includes means for adjusting the resistance of the locked door.

The foregoing and other objects are achieved in accordance with the present invention by providing a training device for practicing the techniques of forcibly opening locked doors using forcible entry tools, comprising:

a door having an inner vertical edge and an outer edge, the door being hingedly mounted within a door frame for swinging movement between a door closed position, wherein the door is positioned within the plane of the door frame, and a door open position, wherein the inner edge of the door is outside the plane of the door frame;

a door frame including a vertical jamb having a vertical surface adjacent the inner vertical edge of the door, the vertical jamb being hollow and having an opening therein communicating with the hollow of the jamb;

the door including a pin projecting from its inner vertical edge toward the jamb and being received within the opening in the jamb when the door is in the closed position;

the jamb including a pair of vertically opening and closing hinged jaws within the hollow communicating with the opening, the jaws being operable between jaws open and jaws closed positions, and biasing means in the hollow biasing the jaws into the jaws closed position;

whereby, in the door closed position, the pin projects into the opening in the jamb and is clamped therein by the jaws in the jaws closed position for holding the door tightly closed.

In another aspect of the present invention, the training device further includes a door mounting frame hingedly mounted within a door frame for swinging movement into and out of the plane of the door frame, the door being substantially hollow and slidably mounted on the door mounting frame for sliding movement toward and away from the jamb.

In still another aspect of the present invention, the projecting portion of the pin is tapered, preferably conically, the tapered portion having its largest diameter at the end thereof remote from the door.

In yet another aspect of the present invention, the training device includes a reset assembly associated with said jaws for operating said jaws from a jaws open position to a jaws closed position for resetting the training device after the door has been forced open and the jaws have been forced into the jaws open position, the reset assembly desirably being operatively connected to a reset handle which is releasably mounted to the door frame.

BRIEF DESCRIPTION OF THE DRAWINGS

FIG. 9 is a perspective view of the interior of the hollow door jamb of the training device of FIG. 1 showing the locking jaws assembled in the closed position within the door jamb.

FIG. 10 is a perspective view of the interior of the hollow door jamb, as shown in FIG. 9, with the locking jaws reset assembly installed.

DESCRIPTION OF THE PREFERRED EMBODIMENT

Figure 2:
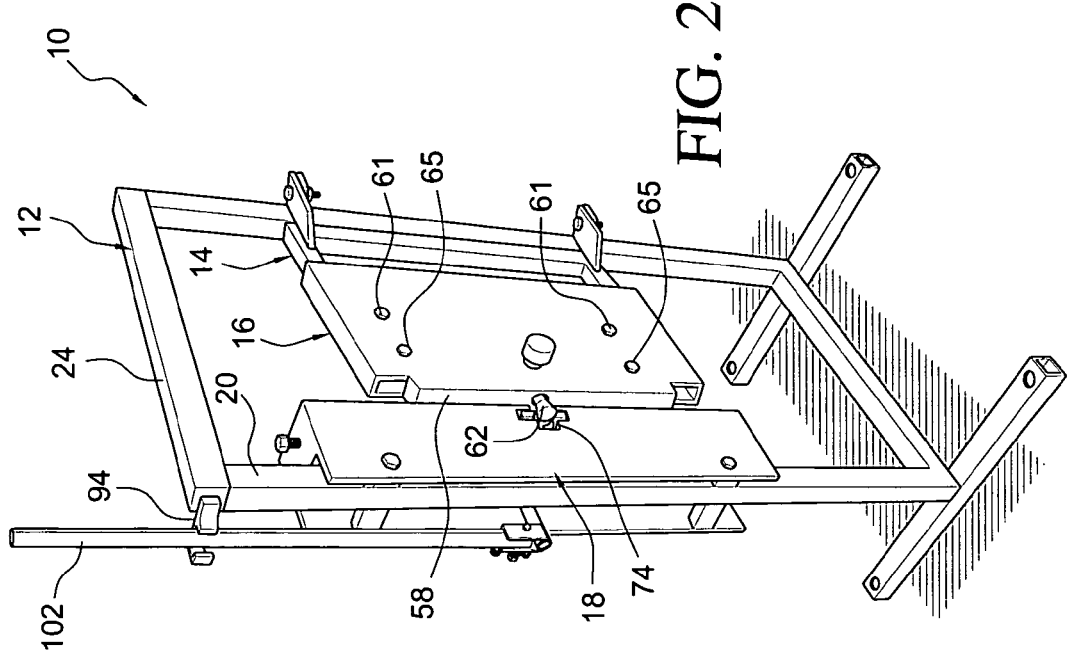
FIG. 2 is another perspective view of the training device of FIG. 1 viewed from its rear side.
Figure 1:
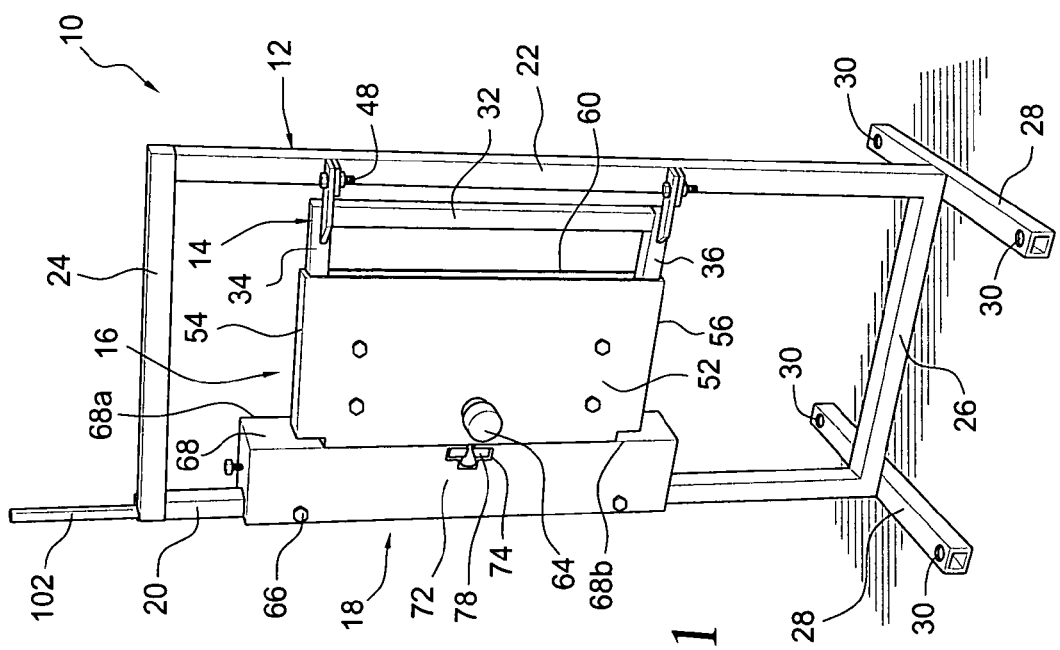
FIG. 1 is a perspective view of the training device of the present invention viewed from its rear side.

Referring to FIGS. 1-8, a preferred embodiment of the forcible door entry training simulator of the present invention is shown generally at 10. The training simulator comprises a simulator support frame 12 having a door mounting frame 14 hingedly connected thereto, a door 16 slidably mounted on the door mounting frame and a door jamb 18 rigidly connected to the simulator support frame 12 and aligned with the door 16. The training device simulates a closed, locked door that can be forcibly opened, reset and then forcibly opened again, multiple times, without damaging the simulator.

Simulator support frame 12 is, preferably, generally rectangular and consists of a left vertical support 20, a right vertical support 22, an upper horizontal support 24 connecting the upper ends of the left and right vertical supports 20, 22 and a lower horizontal support 26 connecting the lower ends of the left and right vertical supports 20, 22. A pair of elongate base members 28 extend perpendicularly from the underside of the lower horizontal support 26 for stabilizing the simulator support frame 12 upon a floor or flat work area to prevent tipping of the frame when forces are exerted against it during a forcible door entry training simulation. Desirably, mounting apertures 30 are provided adjacent the free ends of each of the base members 28 for securing the base members 28 to the floor with suitable fasteners (not shown), such as threaded bolts. Preferably each of the vertical and horizontal supports and the base members are formed of suitable strength tubular steel or channel steel. The supports and base members are either permanently secured to each other, such as by welding or other suitable attachment means, or removably secured to each other, such as by using angle brackets and removable bolts. If the supports and base members are removably secured to each other, it will be appreciated that simulator support frame 12 may be disassembled for transport or storage.

Door mounting frame 14 consists of a vertical frame member 32 connected at one of its ends to an upper horizontal frame member 34 and at its other end to a lower horizontal frame member 36. An intermediate vertical support member 38, which is generally parallel to and spaced from vertical frame member 32, extends between and is connected to intermediate portions of each of the upper and lower horizontal frame members 34, 36. A pair of flange plates 40 extend from each of the horizontal frame members 34, 36, at locations adjacent where they connect to vertical frame member 32, in a direction away from intermediate vertical support member 38. The flange plates 40 include apertures 42 therein and rest upon corresponding spaced apart mounting plates 44 (see FIG. 7), which extend from right vertical support 22 in a direction perpendicular to the plane defined by simulator support frame 12. Mounting plates 44 include apertures (not shown) therein in alignment with apertures 42 of flange plates 40 for hingedly supporting door mounting frame 14 on simulator support frame 12. A suitable hinge bolt 48 extends through the apertures in plates 40, 44 for defining a pivotal connection between door mounting frame 14 and simulator support frame 12 for allowing swinging movement of door mounting frame 14 into and out of the plane of simulator support frame 12.

Door 16 is generally rectangular and hollow and consists of a pair of front and rear, generally parallel face panels 50, 52 spaced apart by generally parallel upper and lower horizontal end supports 54, 56 to which the panels 50, 52 are connected. A vertical side support 58 is connected to the front and rear face panels 50, 52 along one side 59 thereof, the opposite side 60 remaining open. Door 16 is mounted on door mounting frame 14 by sliding the open side 60 over the free ends of upper and lower horizontal frame members 34, 36 of door mounting frame 14 in such a manner that the underside of upper horizontal end support 54 of door 16 slidably engages and is slidably supported by the upper side of upper horizontal frame member 34 while the lower horizontal frame member 36 is housed within the hollow of door 16. Door 16 is free to slide back and forth along door mounting frame 14 without the free ends of upper and lower horizontal frame members 34, 36 of door mounting frame 14 contacting the inner side of vertical side support 58 because vertical side support 58 does not extend along side 59 to the upper and lower end portions of panels 50, 52 and, thus, does not interfere with the free sliding movement of door 16. When mounted on door mounting frame 14, door 16 is constrained from sliding off of upper and lower horizontal frame members 34, 36 in the direction away from door jamb 18 by two vertically spaced apart stop bolts 65 inserted through aligned apertures in panels 50, 52 such that they pass through door mounting frame 14 on the side of intermediate vertical support 38 remote from vertical frame member 32. As the door 16 slides in the direction away from door jamb 18, as when it is forcibly opened, it is prevented from sliding off of horizontal frame members 34, 36 by bolts 65 striking intermediate vertical support member 38. However, with door 16 open, it is possible for it to slide off of horizontal frame members 34, 36 in the opposite direction. To prevent this, after door 16 has been mounted onto door mounting frame 14, two vertically spaced apart bolts 61 are inserted through aligned apertures in panels 50, 52 such that they pass through door mounting frame 14 between intermediate vertical support 38 and vertical frame member 32. In this manner, door 16 is prevented from sliding off of horizontal frame members 34, 36 by bolts 61 striking intermediate vertical support member 38. Grease fittings, not shown, are positioned along the slide path to minimize friction during sliding. Door 16, of course, must be dimensioned to accommodate door mounting frame 14 therewithin, is preferably dimensioned to allow door mounting frame 14 to fit closely therewithin and is mountable on door mounting frame 14 without extending beyond both ends of upper and lower horizontal frame members 34, 36.

Figure 14:
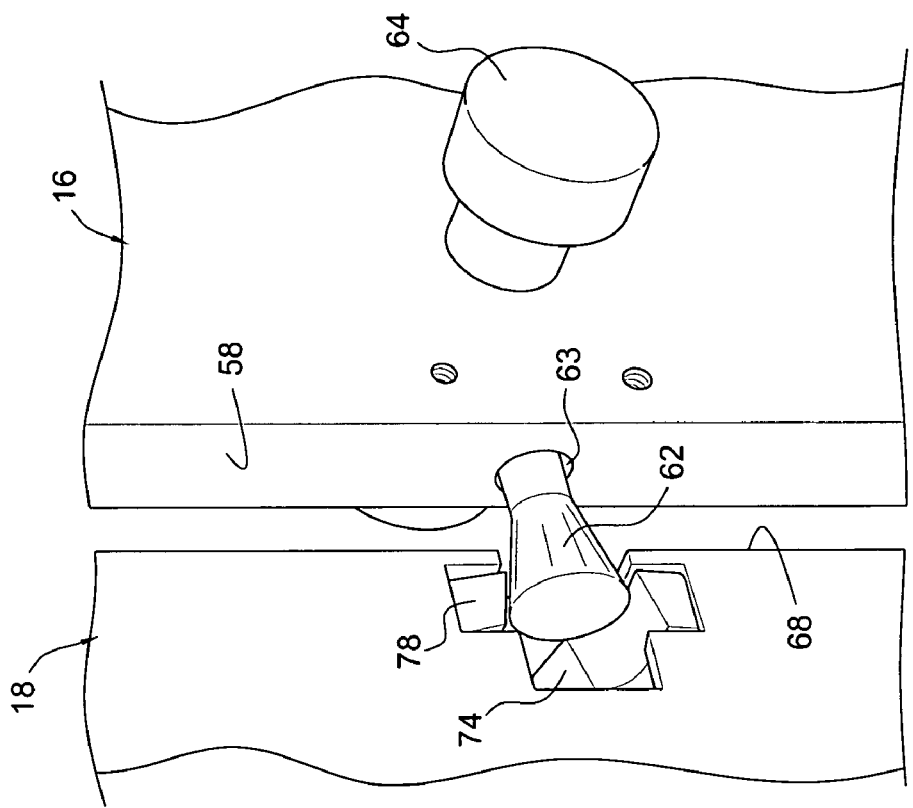
FIG. 14 is a perspective view showing the locking jaws open and the door pin released after the door has been pried open.
Figure 13:
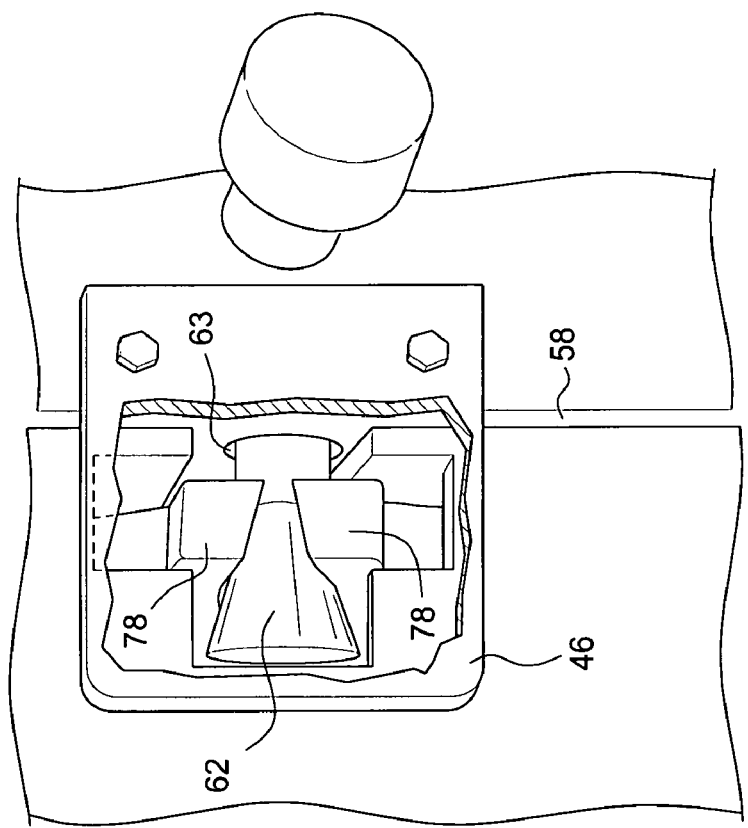
FIG. 13 is a perspective view showing the locking jaws closed around the door pin.

A tapered pin 62 projects through an opening 63 in vertical side support 58 toward door jamb 18 at a vertical position along vertical side support 58 where a deadbolt lock would traditionally be located on a standard door. Pin 62 preferably includes a threaded shank extending through opening 63 and threaded into a threaded lock nut (not shown) which is welded to the inside of side support 58. This arrangement allows the extent of projection of tapered pin 62 from vertical side support 58 to be closely controlled. Tapered pin 62, as can be seen most clearly in FIGS. 13 and 14, is generally conically shaped with its smallest diameter adjacent vertical side support 58 and its largest diameter at its free end. Door 16 includes a mock doorknob 64 projecting from each of face panels 50, 52 located where a doorknob would be mounted on a standard door.

Door 16 and door mounting frame 14, like simulator support frame 12, are formed of suitable strength tubular steel or channel steel selected to withstand the stresses they experience when forces are exerted against them during multiple forcible door entry training simulations. Also like simulator support frame 12, the structural elements of the door 16 and door mounting frame 14 are either permanently secured to each other, such as by welding or other suitable attachment means, or removably secured to each other, such as by using angle brackets and removable bolts. Indeed, it is desirable that the door and door jamb, which are directly contacted during forcible entry, are formed of especially durable plate steel, such as AR 400 plate steel. Likewise, the tapered pin 62 is formed of particularly durable steel. In one embodiment of the invention, a Grade 8 socket head bolt is machined to form the tapered pin, thus providing an aperture for an Allen wrench to be inserted to assist in threading tapered pin 62 into side support 58.

Figure 4:
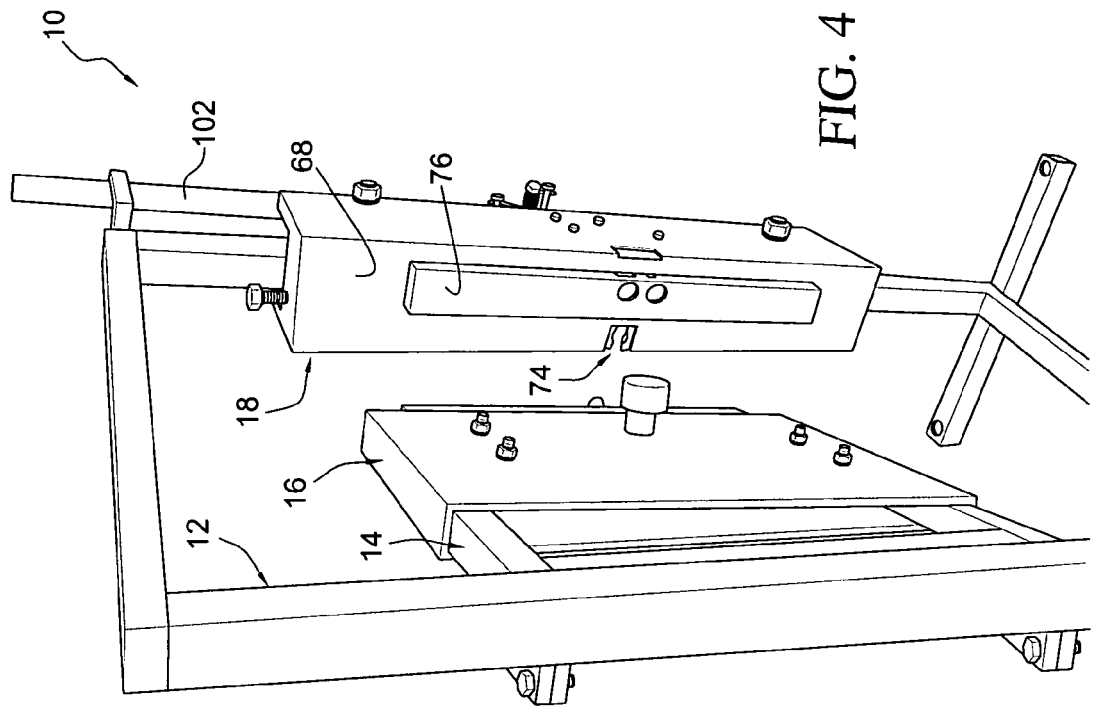
FIG. 4 is another perspective view of the training device of FIG. 1 viewed from its front side.
Figure 3:
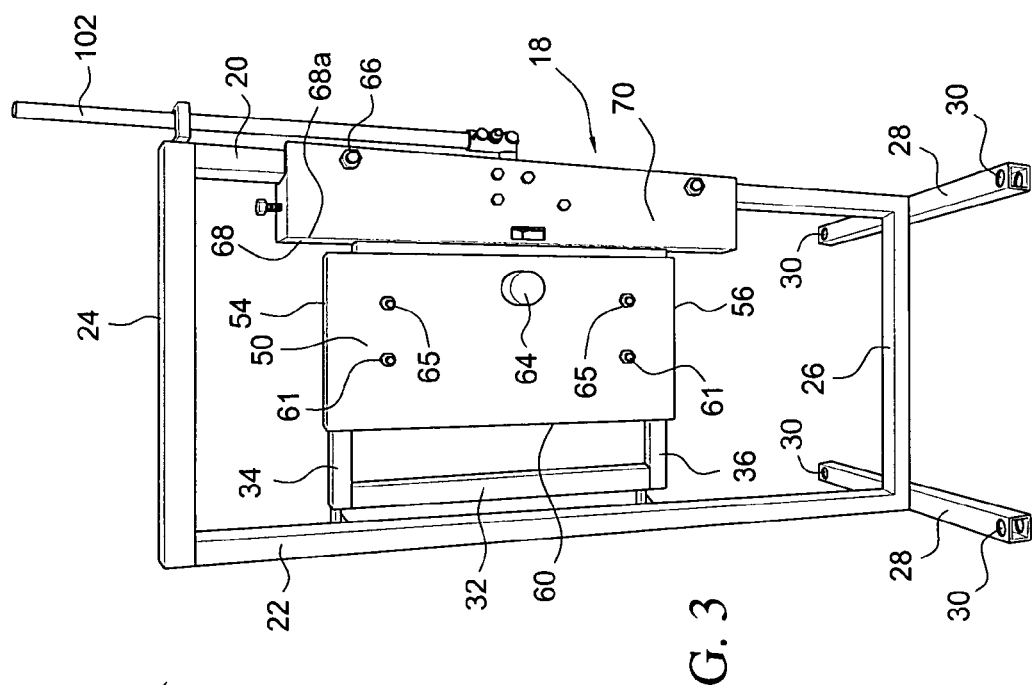
FIG. 3 is a perspective view of the training device of FIG. 1 viewed from its front side.
Figure 6:
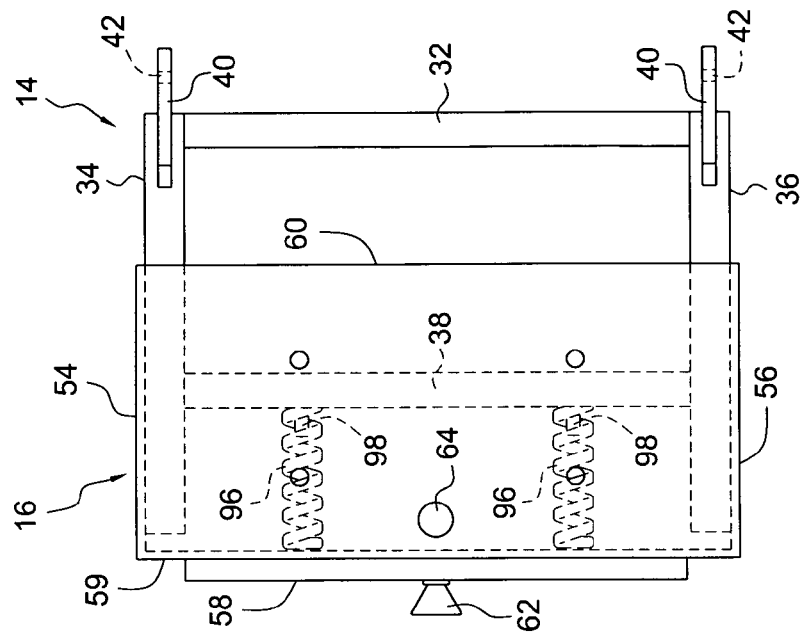
FIG. 6 is a front elevational view of the assembled door and door mounting frame of the training device of FIG. 1.
Figure 5:
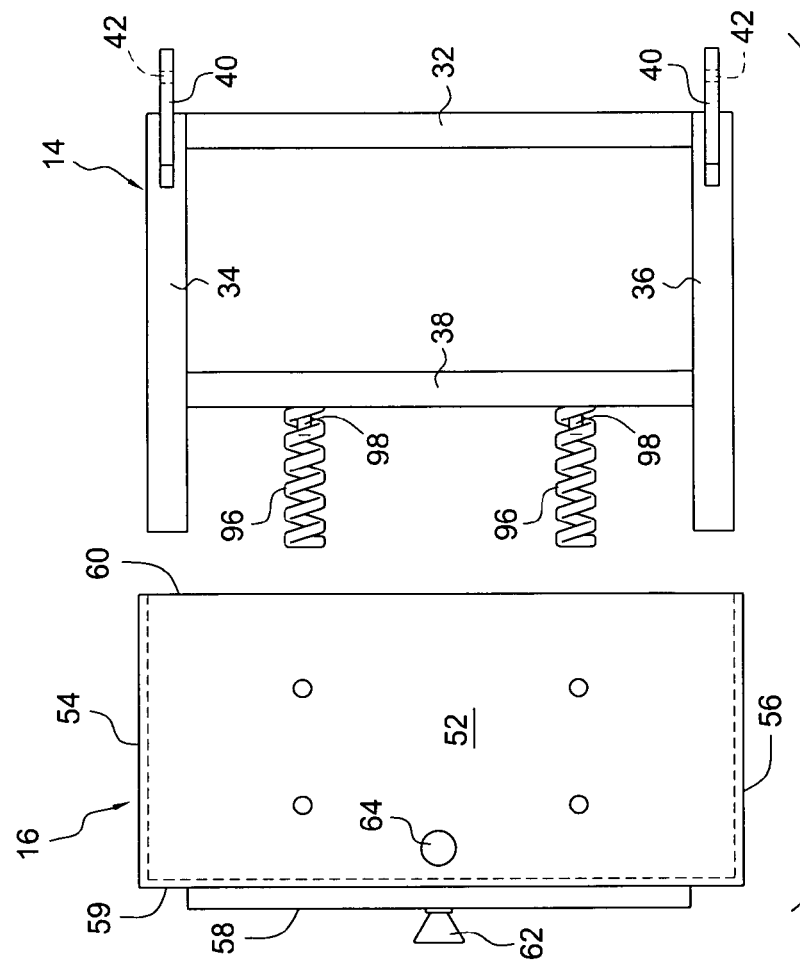
FIG. 5 is a front elevational view of the door and door mounting frame components of the training device of FIG. 1 prior to assembly.

Door jamb 18 desirably is a vertically elongate, hollow, generally rectangular housing which is mounted upon left vertical support 20, as for example by bolts 66, and extends a short distance forwardly and rearwardly beyond the plane of simulator support frame 12. Door jamb 18 consists of a generally channel shaped structure having a flat, vertically elongate web surface 68, having a forward edge 68a and a rearward edge 68b, which faces side support 58 of door 16 and two parallel channel walls 70, 72 extending from edges 68a and 68b in a direction away from side support 58. An opening 74 is defined in the rearward edge 68b and in surface 68 which is large enough to accommodate the conical portion of tapered pin 62 and is positioned in registry with the projecting tapered pin 62 such that door 16 can swing on hinge bolts 48 between a door closed position wherein door 16 is wholly within the plane of simulator support frame 12 and the conical portion of tapered pin 62 is housed within opening 74 (FIGS. 1, 3, 13) and a door open position wherein door 16 pivots rearwardly out of the plane of simulator support frame 12 until the tapered pin 62 exits opening 74 (FIGS. 2, 4, 14). A stop 76 is positioned on surface 68 immediately forward of opening 74 to prevent door 16 from swinging past a position on the jamb 18 where the tapered pin 62 is in registry with opening 74. Thus, with a person standing in front of simulator training device 10 such that the door 16 can only swing rewardly, i.e., open away from the position of the person (FIG. 4), the simulator 10 simulates an inward swinging residential door. However, with a person standing on the opposite side, i.e., at the rear of the simulator training device 10, such that the door 16 now swings toward the position of the person, the simulator 10 simulates an outward swinging commercial door (FIG. 2).

Figure 9A:
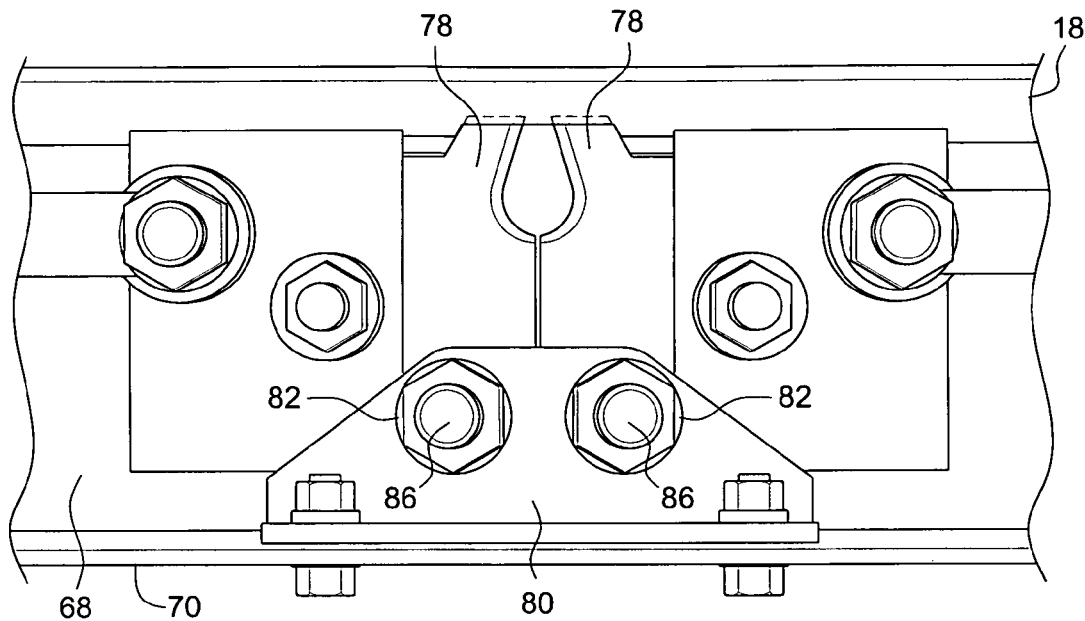
FIG. 9A is an enlarged perspective view of the locking jaws assembled in the closed position within the door jamb.
Figure 9B:
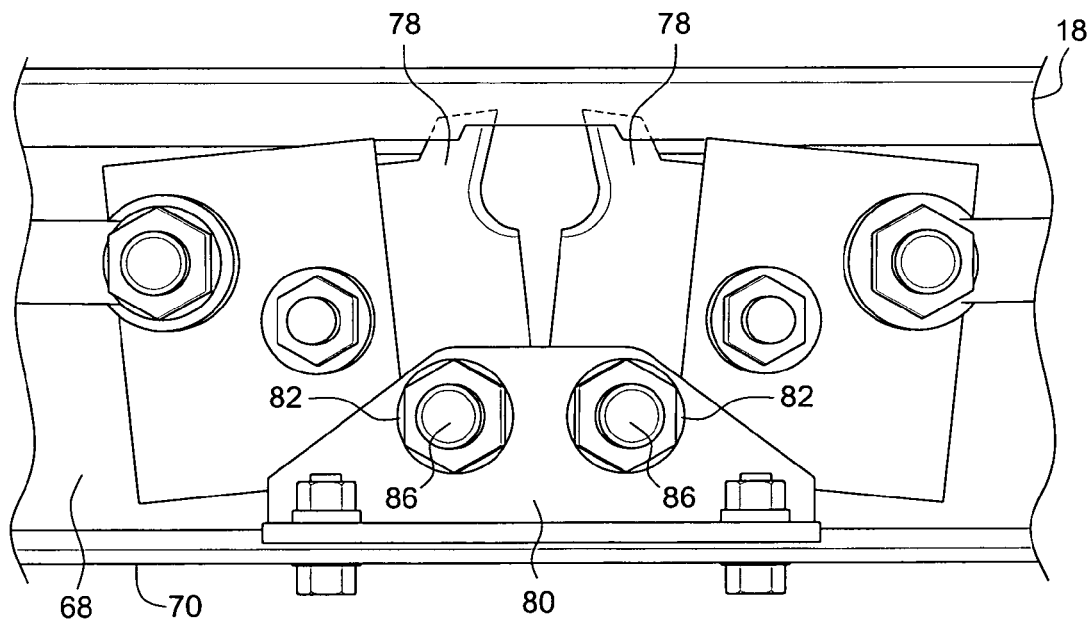
FIG. 9B is an enlarged perspective view of the locking jaws assembled in the open position within the door jamb.
Figure 12:
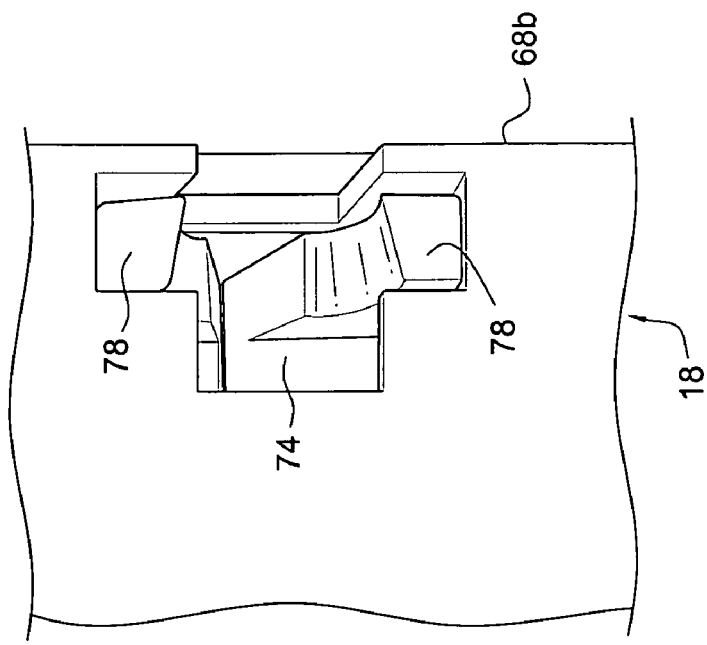
FIG. 12 is a perspective view of the hollow door jamb with the locking jaws in the open position.
Figure 11:
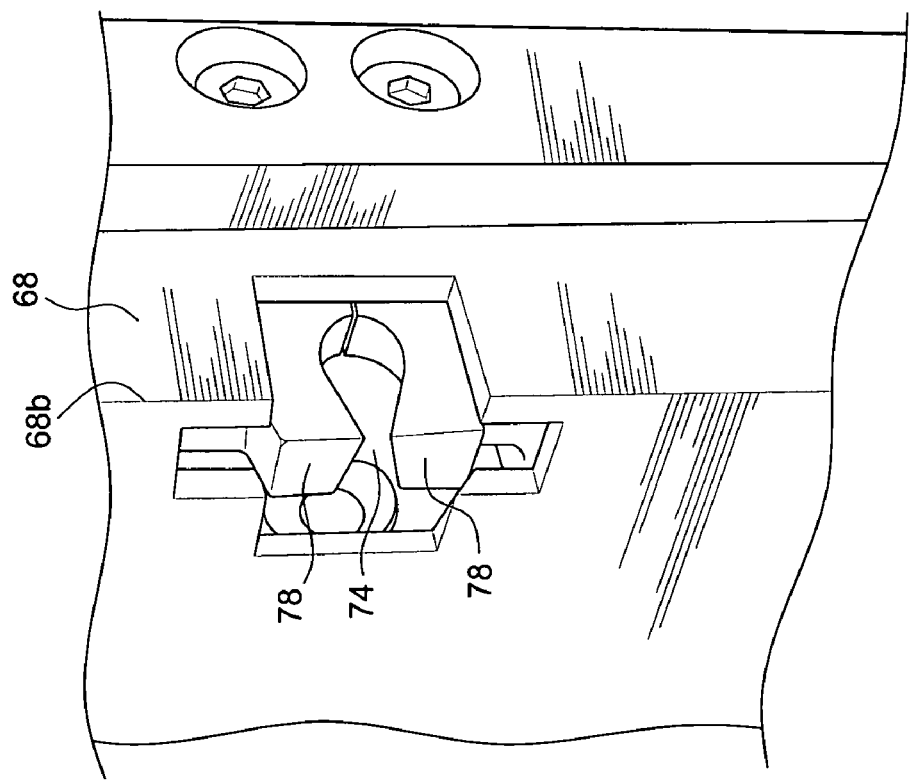
FIG. 11 is a perspective view of the hollow door jamb with the locking jaws in the closed position.

Referring now to FIGS. 9 and 9A, door jamb 18 is depicted from above resting upon surface 68. Mounted within door jamb 18 and communicating with opening 74 are a pair of tapered jaws 78 that pivot between a jaws closed position, as shown in FIGS. 9, 9A and 11, and a jaws open position, as shown in FIGS. 9B and 12. Jaws 78 are supported on base 80 which is mounted to channel wall 70. Base 80 includes a pair of apertures 82 which are in registry with apertures (not shown) in each of jaws 78. The jaws 78 are pivotable about pivot bolts 86 which extend through apertures 82 in the base and an aperture (not shown) in each jaw 78. Referring to FIG. 9, each of jaws 78 is attached through adjustable threaded nut means 88 to one end of a compression spring 90, the other end of each compression spring 90 being seated against a wall 92 interconnecting the channel walls 70, 72 of door jamb 18. Compression springs 90 bias the jaws 78 into the jaws closed position around the conical portion of pivot pin 62, as can be seen in FIG. 13, and apply pressure to pin 62 to maintain door 16 tightly closed. It will be appreciated that the force exerted by the compression springs 90 against jaws 78 can be adjusted by moving the threaded nut means 88 toward the spring 90 to increase spring tension and away from the spring 90 to decrease spring tension to simulate the resistance of different lock mechanisms.

Figure 8:
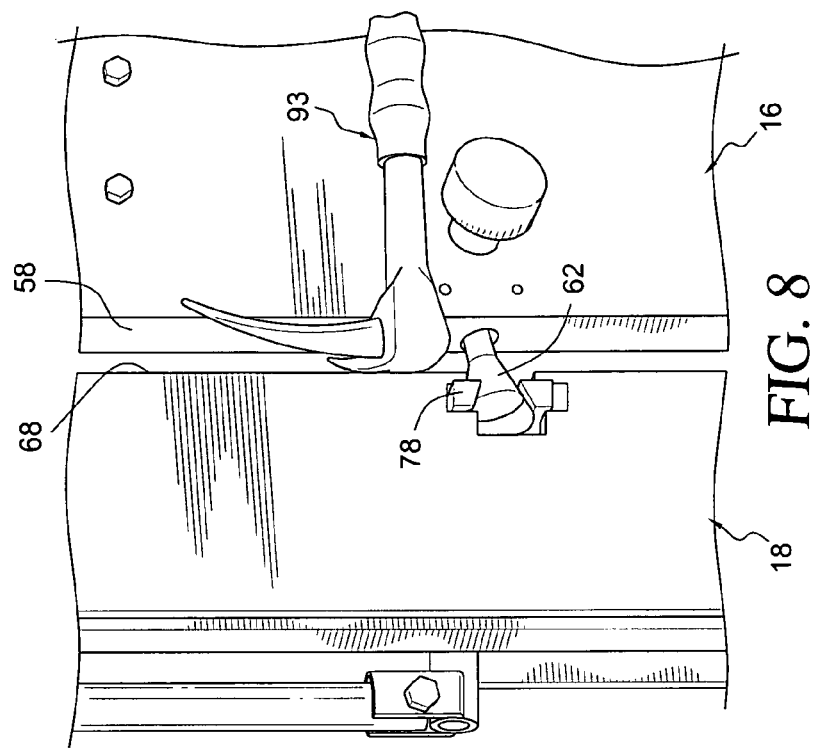
FIG. 8 is a perspective view of the training device of FIG. 1 showing the use of a forcible entry tool from the rear side.
Figure 7:
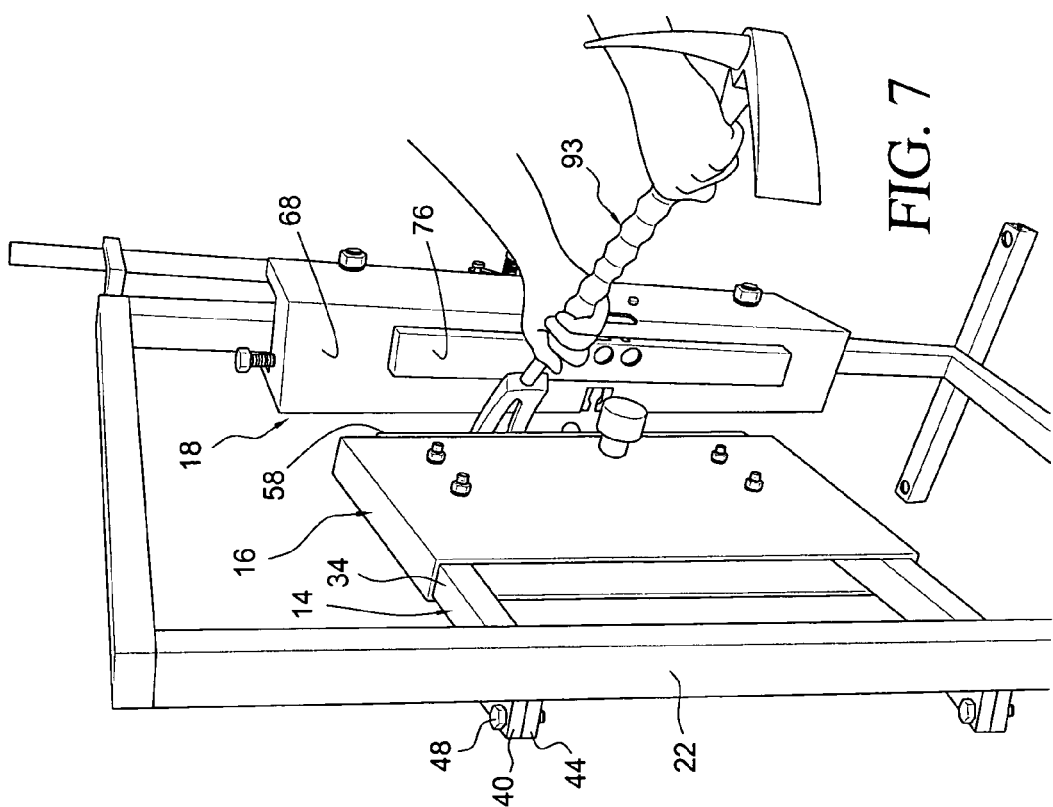
FIG. 7 is a perspective view of the training device of FIG. 1 showing the use of a forcible entry tool from the front side.

FIG. 7 shows a method of using the training device of the present invention to force open a locked door where the door opens away from the person attempting to open it. In such circumstances, the claw end of a Halligan tool 93 is wedged between door stop 76 and vertical side support 58 of door 16 slightly above or below tapered pin 62 and force is applied to the tool 93, e.g., by striking the adze of the tool with a flathead axe, using the tool 93 as a lever to force the door 16 open. The force transmitted by the Halligan tool 93 forces the door 16 to slide along upper horizontal frame member 34 in a direction away from door jamb 18, until stop bolts 65 strike intermediate vertical support 38, at which time the force causes the conical portion of the tapered pin 62 to move through the jaws 78 and, as the increased diameter portion of the tapered pin 62 moves through the jaws 78, the transmitted force overcomes the force of the compression springs 90 and causes the jaws 78 to move to the jaws open position, allowing door 16 to swing open. FIG. 8 shows a method of using the training device of the present invention to force open a locked door where the door opens toward the person attempting to open it. In such circumstances, the adze end of a Halligan tool 93 is wedged between web surface 68 of door jamb 18 and vertical side support 58 of door 16 slightly above or below tapered pin 62 and force is applied to the tool 93, using tool 93 as a lever, to force the door 16 open by causing the door 16 to slide along upper horizontal frame member 34 in a direction away from door jamb 18, until stop bolts 65 strike intermediate vertical support 38, at which time the force causes the increased diameter portion of the tapered pin 62 to move through jaws 78, forcing the jaws 78 to open and allowing the door 16 to swing open. FIG. 12 shows door jamb 18 with jaws 78 in the jaws open position and FIG. 14 illustrates the door 16 partially swung open with jaws 78 in the jaws open position. In a preferred embodiment of the invention, shown in FIG. 13, a cover plate 46 is bolted to the rear side of door 16 adjacent door knob 64 and extends across a sufficient portion of rear channel wall 72 to cover opening 74 in door jamb 18. Cover plate 46 performs a safety function by preventing persons from inadvertently placing their fingers into opening 74 and by preventing persons attempting to forcibly open door 16 from the rear side (see FIG. 8) from inserting Halligan tool 93 into opening 74 and damaging jaws 78.

Figure 15:
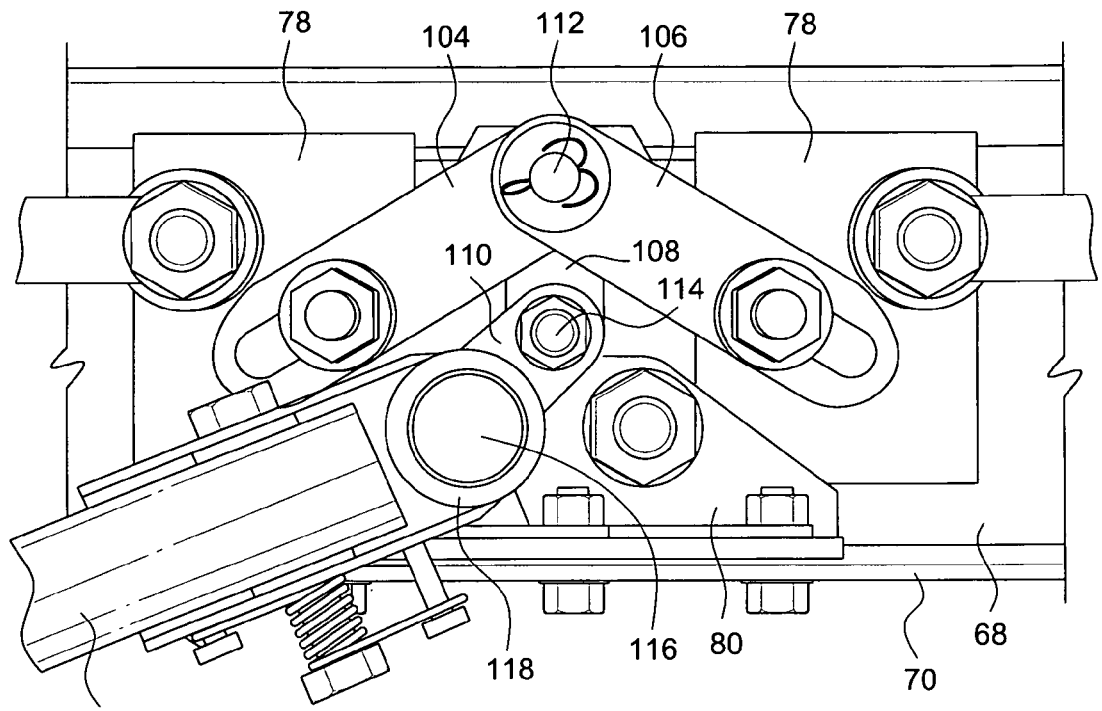
FIG. 15 is a perspective view, as in FIG. 10, showing the position of the reset assembly when the locking jaws are in the closed position and the reset handle is engaged.
Figure 16:
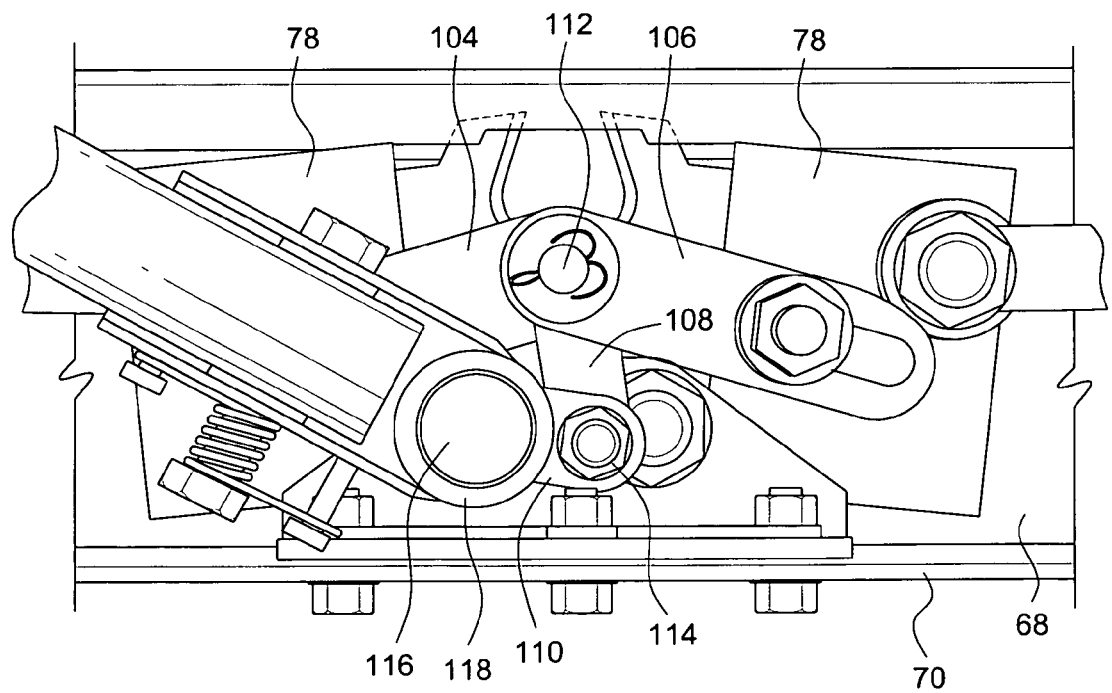
FIG. 16 is a perspective view, as in FIG. 10, showing the position of the reset assembly when the locking jaws are in the open position and the reset handle is engaged.

It will be appreciated that the ability to re-use simulator training device 10 over and over again is an essential characteristic if use of a training simulator is to be practical. In accordance with the present invention, with reference to FIG. 10, a reset assembly 100 is provided which includes an externally mounted reset handle 102 in operative association with jaws 78. In this connection, simulator support frame 12 includes a U-shaped bracket 94 (FIG. 2) mounted on and extending outwardly of frame 12 from upper horizontal support 24 adjacent to where it connects to left vertical support 20. The opening of the U-shape is slightly less than the diameter of handle 102, allowing handle 102 to be pressed into and retained by the U-shape for mounting therein. Referring also to FIGS. 15 and 16, reset assembly 100 consists of four links 104, 106, 108, 110, of which each of links 104 and 106 have one end pivotably attached to each of jaws 78 and the other end pivotably interconnected with the other link, as via a first pivot pin 112 extending through aligned apertures when the other ends of links 104, 106 are overlapped. Links 104, 106 define therebetween, when jaws 78 are closed, an angle less than 180° (FIG. 15). When jaws 78 are open, links 104, 106 define a greater angle than when jaws 78 are closed, but still less than 180° (FIG. 16). Link 108 has one end pivotably interconnected with links 104, 106 via first pivot pin 112 and extends vertically downwardly from first pivot pin 112. The other end of link 108 is pivotably connected with one end of link 110, as via a second pivot pin 114 extending through aligned apertures when the ends of links 108, 110 are overlapped. With the jaws 78 in the jaws open position, which will be the case prior to reset, link 110 is generally parallel to channel wall 70. The free end of link 110 includes a protrusion 116 which mates with a socket 118 mounted at one end of handle 102. To reset simulator training device 10 for re-use, tapered pin 62 must be repositioned within opening 74 by sliding door 16, which was forced away from door jamb 18 during forcible entry, toward door jamb 18 until tapered pin 62 is positioned within opening 74 and then forcing jaws 78 to the closed position around tapered pin 62. Closing jaws 78 is accomplished by disengaging handle 102 from bracket 94 and operating the handle to cause link 110 to apply upward force to link 108, causing the intersection of links 104, 106, 108 at first pivot pin 112 to move vertically upwardly. This decreases the angle between links 104 and 106, causing the jaws 78 to be pulled closed (FIG. 15). Once reset in this manner simulator training device 10 is ready for another training session.

In a preferred embodiment of the present invention, in order to facilitate resetting simulator training device 10 for re-use, at least one but, preferably, a pair of vertically spaced apart door compression springs 96 is provided for biasing door 16 toward door jamb 18. One end of each spring 96 is seated against intermediate vertical support 38 of door mounting frame 14 and the other end is seated against the inside surface of vertical side support 58. Any known means may be used for maintaining the ends of door compression springs 96 seated in fixed position, such as cylindrical protrusions 98 extending from intermediate vertical support 38 toward door jamb 18. Thus, after door 16 has been forced open during a training session, instead of having to manually slide door 16 back toward door jamb 18 for repositioning tapered pin 62 within opening 74, door compression springs 96 bias door 16 toward door jamb 18. Door compression springs 96 exert a mild biasing force against door 16 as contrasted with the biasing force exerted by compression springs 90 against jaws 78. Thus, for purposes of training in the techniques of forcibly opening locked doors, door 16 is held in the door closed position by the biasing force of compression springs 90 against jaws 78 and not by the biasing force of door compression springs 96, the latter being insufficient to hold the door 16 in the door closed position for purposes of training in the techniques of forcibly opening locked doors.

While the present invention has been described in terms of specific embodiments thereof, it will be understood that no limitations are intended to the details of construction or design other than as defined in the appended claims.

The invention claimed is:

1. A training device for training the techniques of forcible entry through a locked door using forcible entry tools, comprising:
   a door having an inner vertical edge and an outer edge, said door being hingedly mounted within a door frame for swinging movement between a door closed position, wherein said door is positioned within the plane of the door frame, and a door open position, wherein said inner edge of said door is outside the plane of the door frame;
   a door frame including a vertical jamb having a vertical surface adjacent said inner vertical edge of said door, said vertical jamb being hollow and having an opening therein communicating with said hollow of said jamb;
   said door including a pin projecting from its inner vertical edge toward said jamb and being received within said opening in said jamb when said door is in the closed position;
   said jamb including a pair of vertically opening and closing hinged jaws within said hollow communicating with said opening, said jaws being operable between jaws open and jaws closed positions, and biasing means in said hollow biasing said jaws into the jaws closed position;
   whereby, in the door closed position, said pin projects into said opening in said jamb and is clamped therein by said jaws in the jaws closed position for holding said door tightly closed.

2. A training device, as claimed in claim 1, further including a door mounting frame hingedly mounted within said door frame for swinging movement into and out of the plane of said door frame, said door being substantially hollow and slidably mounted on said door mounting frame for sliding movement toward and away from said jamb.

3. A training device, as claimed in claim 1, wherein the projecting portion of said pin is tapered, said tapered portion having its largest diameter at the end thereof remote from the door.

4. A training device, as claimed in claim 3, wherein said projecting portion of said pin is generally conical.

5. A training device, as claimed in claim 1, wherein said biasing means comprise compression springs.

6. A training device, as claimed in claim 5, further including means for adjusting the tension in said compression springs.

7. A training device, as claimed in claim 5, wherein said compression springs are oriented vertically within said hollow.

8. A training device, as claimed in claim 1, further including a reset assembly associated with said jaws for operating said jaws from a jaws open position to a jaws closed position for resetting the training device after said door has been forced open and said jaws have been forced into the jaws open position.

9. A training device, as claimed in claim 8, further including a reset handle having one portion operatively connected to said reset assembly and another portion releasably mounted to said door frame.

10. A training device, as claimed in claim 8, wherein said reset assembly includes at least two elongate links, said links having one end connected to one of said pair of jaws and said other ends pivotably interconnected, said links defining therebetween a first angle when said jaws are in the jaws closed position and a second angle when said jaws are in the jaws open position, and including means for altering the angle between said links for moving said jaws between jaws open and jaws closed positions.

11. A training device, as claimed in claim 10, wherein the first angle is an angle less than 180° and said second angle is a larger angle, also less than 180°.

12. A training device, as claimed in claim 10, wherein said means for altering the angle comprises means connecting with said pivotal interconnection and a reset handle, whereby movement of said handle alters the angle between said links for moving said jaws between jaws open and jaws closed positions.

13. A training device, as claimed in claim 12, wherein said means connecting with said pivotal interconnection and said reset handle comprises at least one additional link, said at least one additional link including a protrusion for mating with a socket on said handle.

14. A training device, as claimed in claim 2, wherein said door comprises a pair of opposite, generally rectangular flat panels interconnected at their upper and lower ends by upper and lower horizontal support members and along one side by a vertical support member extending between said upper and lower horizontal support members, said vertical support member defining said inner vertical edge of said door, said opposite side of said panels remaining open for slidably mounting said door upon said door mounting frame.

15. A training device, as claimed in claim 12, wherein said door mounting frame comprises a vertical frame member interconnected at its ends with upper and lower horizontal frame members for defining a generally rectangular door mounting frame which is dimensioned to fit within said hollow door with said upper horizontal frame member slidably supporting said upper horizontal support member of said door.

16. A training device, as claimed in claim 15, further including an intermediate vertical support member connected between said upper and lower horizontal frame members and spaced from said vertical frame member.

17. A training device, as claimed in claim 16, further including at least one door compression spring having one end seated against said intermediate vertical support member and said other end seated against a vertical support member defining said inner vertical edge of said door for biasing said door toward said door jamb.

18. A training device, as claimed in claim 17, wherein said at least one door compression spring exerts a biasing force which is insufficient to hold said door in the door closed position for purposes of training in the techniques of forcible entry through a locked door.

19. A training device, as claimed in claim 16, including stop means for preventing said door from sliding off of said door mounting frame when said door is in the door open position.

20. A training device, as claimed in claim 19, wherein said door comprises a pair of opposite, generally rectangular flat panels interconnected at their upper and lower ends by upper and lower horizontal support members said stop means comprises at least one stop means extending between said opposite door panels and passing through said door mounting frame between said vertical frame member and said intermediate vertical support member.

21. A training device, as claimed in claim 1, wherein said vertical door jamb comprises a generally channel shaped, vertically elongate structure comprising a flat, elongate web, defining said jamb vertical surface, and rear and front channel walls extending from said web in a direction away from said inner vertical edge of said door, said opening extending into said rear channel wall for permitting said pin to enter and exit said opening as said door swings between door open and door closed positions.

22. A training device, as claimed in claim 21, further including a door stop positioned on said jamb vertical surface immediately forward of said opening for preventing said door from swinging past a position where the tapered pin is in registry with said opening.

* * * * *